US005660604A

United States Patent [19]

Wood

[11] Patent Number: 5,660,604
[45] Date of Patent: Aug. 26, 1997

[54] METHOD OF MAKING CERAMIC ABRASIVE GRITS

[75] Inventor: William P. Wood, Golden Valley, Minn.

[73] Assignee: Minnesota Mining and Manufacturing Company, St. Paul, Minn.

[21] Appl. No.: 705,390

[22] Filed: Aug. 30, 1996

Related U.S. Application Data

[63] Continuation of Ser. No. 474,730, Jun. 7, 1995, Pat. No. 5,551,964, which is a continuation of Ser. No. 237,400, May 3, 1994, Pat. No. 5,431,705, which is a continuation of Ser. No. 976,893, Nov. 16, 1992, Pat. No. 5,312,789, which is a continuation of Ser. No. 799,867, Nov. 27, 1991, Pat. No. 5,164,348, which is a continuation of Ser. No. 645,349, Jan. 24, 1991, abandoned, which is a continuation-in-part of Ser. No. 54,440, May 27, 1987, abandoned.

[51] Int. Cl.$^6$ ....................................... C09C 1/68
[52] U.S. Cl. ..................... 51/309; 51/294; 51/295; 51/298; 51/307
[58] Field of Search .................... 51/309, 294, 295, 51/298, 307

[56] References Cited

U.S. PATENT DOCUMENTS

| | | | |
|---|---|---|---|
| 3,108,888 | 10/1963 | Bugosh | 106/62 |
| 3,450,515 | 6/1969 | Amero | 51/307 |
| 3,717,497 | 2/1973 | Stradley et al. | 117/169 R |
| 3,859,399 | 1/1975 | Bailey et al. | 264/29 |
| 4,007,020 | 2/1977 | Church et al. | 51/295 |
| 4,229,221 | 10/1980 | Uemura et al. | 106/58 |
| 4,314,827 | 2/1982 | Leitheiser et al. | 51/298 |
| 4,497,874 | 2/1985 | Hale | 428/551 |
| 4,552,786 | 11/1985 | Berneburg et al. | 427/249 |
| 4,574,003 | 3/1986 | Gerk | 51/309 |
| 4,610,693 | 9/1986 | Niwa et al. | 623/16 |
| 4,623,364 | 11/1986 | Cottringer et al. | 51/309 |
| 4,734,104 | 3/1988 | Broberg | 51/295 |
| 4,744,802 | 5/1988 | Schwabel | 51/309 |
| 4,770,671 | 9/1988 | Monroe et al. | 51/293 |
| 4,881,951 | 11/1989 | Wood et al. | 51/309 |
| 5,009,676 | 4/1991 | Rue et al. | 51/309 |
| 5,164,348 | 11/1992 | Wood | 501/127 |
| 5,282,875 | 2/1994 | Wood et al. | 51/298 |
| 5,312,789 | 5/1994 | Wood | 501/127 |
| 5,372,620 | 12/1994 | Rowse et al. | 51/309 |
| 5,431,705 | 7/1995 | Wood | 51/309 |
| 5,551,964 | 9/1996 | Wood | 51/309 |

FOREIGN PATENT DOCUMENTS

| 200 487 | 11/1986 | European Pat. Off. | C09K 3/14 |
|---|---|---|---|
| 2099012 | 12/1982 | United Kingdom | B24D 3/34 |

*Primary Examiner*—Deborah Jones
*Attorney, Agent, or Firm*—Gary L. Griswold; Walter N. Kirn; Richard Francis

[57] ABSTRACT

Ceramic abrasive grits are formed by an impregnation process that involves preparing an alumina hydrate sol, drying the sol to form a porous solid, crushing the solid to produce particles, calcining the dried particles, preparing a mixture of an additive metal oxide or its precursor in a liquid vehicle, impregnating the mixture into the calcined particles, drying the impregnated particles, calcining the dried impregnated particles, and firing the particles to produce ceramic abrasive grits. The concentration of the modifying additive metal is greater at or near the surface of the grit than at the interior of the grit.

7 Claims, No Drawings

METHOD OF MAKING CERAMIC ABRASIVE GRITS

REFERENCE TO PRIOR APPLICATIONS

This is a continuation of application Ser. No. 08/474,730, filed Jun. 7, 1995, now U.S. Pat. No. 5,551,964, which is a continuation of application Ser. No. 08/237,400 filed May 3, 1994, now U.S. Pat. No. 5,431,705, which is a continuation of application Ser. No. 07/976,893 filed Nov. 16, 1992, now U.S. Pat. No. 5,312,789, which is a continuation of application Ser. No. 07/799,867 filed Nov. 27, 1991, now U.S. Pat. No. 5,164,348, which is a continuation of application Ser. No. 07/645,349, filed Jan. 24, 1991, abandoned, which is a continuation-in-part of application Ser. No. 07/054,440, filed May 27, 1987, abandoned.

TECHNICAL FIELD

This invention relates to the production of alumina-based ceramic abrasive grits, a method of making the same, abrasive products made with the abrasive grits and a method of using the abrasive products.

BACKGROUND ART

The preparation by a sol-gel process of dense, alumina-based ceramic abrasive grain is described, for example, in Leitheiser et al, U.S. Pat. No. 4,314,827, assigned to the assignee of the present application. This patent teaches making abrasive grains by employing chemical ceramic technology by gelling alumina monohydrate with a precursor of at least one modifying component followed by dehydration and firing. The modifying component is selected from zirconia, hafnia, a combination of zirconia and hafnia, and a spinel derived from alumina and at least one oxide of cobalt, nickel, zinc, or magnesium.

Abrasive products containing ceramic abrasive grits made by a sol gel process have been found to perform in a superior manner as compared to the best fused synthetic abrasive mineral in many applications. A typical example of a high performance fused synthetic abrasive mineral is formed of fused alumina-zirconia available, for example, under the trade designation "NorZon" from the Norton Company.

Other references which disclose the preparation of alumina-based ceramic abrasive grains include the following:

Cottringer et al, U.S. Pat. No. 4,623,364, issued Nov. 18, 1986, entitled Abrasive Material and Method For Preparing The Same.

Gerk, U.S. Pat. No. 4,574,003, issued Mar. 4, 1986, entitled Process For Improved Densification of Sol-Gel Produced Alumina-Based Ceramics.

Amero, U.S. Pat. No. 3,450,515 discloses a method of making impregnated sintered bauxite abrasive grains. The grains are prepared by impregnating sized particles of calcined bauxite with an aqueous solution of manganese, iron or copper ions, and firing the impregnated particles for at least two hours at 1600° C. The resultant abrasive grains are said to contain agglomerated alpha alumina crystals of a size between 50 and 200 microns, with the preferred crystal size of about 100 microns and higher being preferred. Bauxite is an impure form of alumina containing other oxides including, for example, iron oxide, titania, and silica. Instead of producing abrasive grains of higher strength, the resultant grains are said to be weaker, a result which the patentee appears to desire for stainless steel snagging.

References which disclose the preparation of ceramics include the following:

Church et al, U.S. Pat. No. 4,007,020 discloses a method of producing a refractory abrasive body by forming a porous skeletal body which is impregnated with a compound of a metal capable of being converted to an oxide in situ at relatively low temperatures, heating the body so impregnated at a temperature well below the normal vitrification to a temperature of at least 600° F. and for a time sufficient to convert the compound impregnated therein to an oxide and repeating the impregnation and heating steps until the desired degree of hardness is obtained. The porous body can be made from relatively finely divided materials which may be relatively pure powders, mixtures of powders, or impure powders, including additives in the form of discrete particles, fibers, fillers and the like. The powders are molded and bound together or bound together and molded with a binder which may comprise the impregnating compound or other suitable binder prior to treatment. Such refractory materials include alumina, beryllia, magnesia, titania, and zirconia.

Berneberg et at., U.S. Pat. No. 4,552,786, discloses a method for densification ceramic materials which involves dissolving a ceramic precursor in a supercritical fluid, infiltrating the low density ceramic material with the ceramic precursor-laden fluid, and reducing the solubility of the ceramic precursor in the fluid to impregnate the ceramic precursor in the void spaces of the ceramic material.

Bailey et al., U.S. Pat. No. 3,859,399, discloses a method for making dense composite ceramic bodies of titanium diboride, boron carbide, silicon carbide and silicon. The ceramic bodies are produced by forming a mixture of titanium diboride, boron carbide and a temporary binder into a desired shape to obtain a coherent green body which is siliconized by heating in contact with silicon to a temperature about the melting point of silicon, where upon the molten silicon infiltrates the body and reacts with some of the boron carbide therein to produce silicon carbide in situ.

Bugosh, U.S. Pat. No. 3,108,888, discloses processes for producing colloidal, anisodiametric transition aluminas by heating colloidal, anisodia-metric boehmite at a temperature in the range of 300° to 1000° C. until the desired conversion has occurred, and is further directed to the process for making strong, shaped bodies by forming a mass of such boehmite particles and so heating until the boehmite is converted into a transition alumina, and optionally to the alpha form. The temperature of heating could be above the sintering point. Another—method involves the introduction of grain-growth inhibitors and/or sintering-promoting substances such as iron oxide, manganese oxide, copper oxide and titanium oxide to impregnate a porous object of gamma alumina derived from fibrous colloidal boehmite alumina powder. Impregnation by aqueous solutions of soluble precursors of the desired oxide modifier are suggested, followed by drying to fix the modifier on the surface of the individual gamma alumina powders. This patent does not, however, teach the preparation of abrasive grits by this method.

SUMMARY OF THE INVENTION

The present invention provides hard, durable ceramic abrasive grits formed by an impregnation process which have superior abrasive performance in abrading certain workpieces such as those made of stainless steel, titanium, high nickel alloys, aluminum and others, and excellent performance on more conventional workpieces such as mild steel. The ceramic abrasive grits comprise alpha alumina and at least about 0.5% (preferably about 1% to about 30%) by weight of the oxide of at least one metal, as a modifying additive. The additive metal is selected to provide upon calcining and firing, a durable abrasive grit. Preferred additive metals are selected from zirconium, magnesium, hafnium, cobalt, nickel, zinc, yttrium, praseodymium, samarium, ytterbium, neodymium, lanthanum, gadolinium, cerium, dysprosium, and erbium. The most preferred modifying additive is an oxide of yttrium, magnesium, and a rare earth metal selected from praseodymium, samarium, ytterbium, neodymium, lanthanum, gadolinium, cerium, dysprosium, and erbium.

The additive metal oxide will usually react with aluminum oxide to form an additive metal-aluminum oxide reaction product. The oxide of the reaction product of cobalt, nickel, zinc and magnesium will generally be a spinel. The oxide of the reaction product dysprosium and gadolinium with aluminum oxide will generally be a garnet, while the oxide of the reaction product of praseodymium, ytterbium, erbium and samarium with aluminum oxide will generally be a perovskite which may include some garnet. The reaction between lanthanum and aluminum oxides results in beta alumina. The alumina in each case which has not reacted with the additive metal oxide will be substantially in the alpha form.

The general process of making the ceramic abrasive grits of the invention comprises the steps of:

(1) preparing a sol of alumina hydrate, preferably the monohydrate (e.g., boehmite);

(2) drying the sol to form a porous solid comprised of the dried sol;

(3) crushing the dried solid to produce particles;

(4) preparing a homogeneous mixture of an additive metal oxide or its precursor, preferably a water soluble salt, in a liquid vehicle such as water;

(5) calcining the dried particles to substantially remove water of hydration and convert the alumina hydrate to an alumina form which is insoluble in the liquid vehicle;

(6) impregnating the mixture of step (4) into the calcined particles to achieve an average concentration of metal oxide in the resultant ceramic of at least about 0.5% by weight upon firing to produce a ceramic;

(7) drying the impregnated particles;

(8) calcining the dried impregnated particles to substantially remove bound volatile material; and (9) firing the particles to produce ceramic abrasive grits.

Each of the abrasive grits in the same batch made by the method described above is characterized by having a substantially uniform exterior portion from grit to grit comprised of additive metal oxide and alumina. By contrast, abrasive grits made by mixing a solution of a salt of the additive metal with an alumina hydrate hydrosol, gelling the mixture, drying the gel, crushing the dried gel to produce particles, calcining the particles, and firing the calcined particles, as for example described in assignee's U.S. Pat. No. 4,314,827, will have less uniformity from grit to grit. This is thought to be due to migration of the ionic additive metal ion as the gel is dried, which causes a concentration of the additive metal at the surface of large dried gel chunks. Crushing the large surface-enriched, dried gel chunks produces particles which originate from various parts of each dried gel chunk, some from its interior which would be deficient in additive metal, some from the additive metal-enriched surface, and some from the transition area of the dried gel chunk which would produce a particle having only part of its surface enriched with the additive metal. The present invention avoids the problem of grit to grit nonuniformity by preparing grit sized particles of dried alumina which are calcined and then each is impregnated with the additive metal usually as a solution, dried, again calcined, and fired to produce abrasive grits.

Abrasive grits which are deficient in additive metal are characterized by being porous while abrasive grits which have an adequate mount of additive metal are substantially non-porous and dense. The difference in abrasive grains made by the presently claimed method and those of the prior art described above may be demonstrated by immersing grains of each method in a colored dye solution. The porous abrasive grits will absorb much larger mounts of the dye than the dense abrasive grits. Of course, dense abrasive grits perform better than porous abrasive grits.

The invention also provides various abrasive products of a type which includes abrasive grits characterized in that at least part of the abrasive grits are the ceramic abrasive grits of the invention. Preferred abrasive articles include coated abrasive products, bonded abrasive products such as grinding wheels, and nonwoven abrasive products in a form similar to that sold under trade designation Scotchbrite® by the 3M Company.

The invention also provides:

A method of making ceramic abrasive grits, said method comprising the steps of:

a. providing a sol of alumina hydrate;

b. drying the sol to form a dried porous solid comprised of the dried sol;

c. crushing the dried porous solid to produce porous particles;

d. preparing a homogeneous mixture of metal oxide or metal oxide precursor in a liquid vehicle and a material which will cause the metal of the metal oxide precursor to form a precipitate within said porous particles, said metal oxide being capable of being converted upon calcining and firing to a modifying additive;

e. calcining the dried particles of step c to substantially remove water of hydration and convert the alumina hydrate to an alumina form which is insoluble in the liquid vehicle;

f. impregnating the mixture of step d into the calcined particles of step e to achieve an average concentration &modifying additive in the resultant ceramic after¹ firing of at least about 0.5% by weight on a fired solids basis;

g. drying the impregnated particles;

h. calcining the dried impregnated particles to substantially remove bound volatile materials; and i. firing the calcined particles to produce ceramic abrasive grits.

The invention further provides:

A method of making ceramic abrasive grits, said method comprising the steps of:

a. providing a sol of alumina hydrate;

b. drying the sol to form a dried porous solid comprised of the dried sol;

c. crushing the dried porous solid to produce particles having pores;

d. preparing a homogeneous mixture of metal oxide or metal oxide precursor in a liquid vehicle and a material to increase viscosity of the mixture sufficient to reduce migration of said mixture upon drying when impregnated into the pores of said particles yet permit impregnation, said metal oxide being capable of being converted upon calcining and firing to a modifying additive;

e. calcining the dried particles of step c to substantially remove water of hydration and convert the alumina hydrate to an alumina form which is insoluble in the liquid vehicle;

f. impregnating the mixture of step d into the calcined particles of step e to achieve an average concentration of modifying additive in the resultant ceramic after firing of at least about 0.5% by weight on a fired solids basis;

g. drying the impregnated particles;

h. calcining the dried impregnated particles to substantially remove bound volatile materials; and i. firing the calcined particles to produce ceramic abrasive grits.

DETAILED DESCRIPTION

The preparation of the ceramic abrasive grits from an impregnation process first includes the preparation of a dispersion of aluminum oxide monohydrate (e.g., boehmite), usually comprising about 10 to about 60 weight—percent aluminum oxide monohydrate.

The boehmite can either be prepared from various techniques well known in the art or can be acquired commercially from a number of suppliers. Examples of commercially available materials include that available under the trade designation Disperal® produced by Condea Chemic, GMBH and that available under the trade designation Catapal® S. B., produced by Vista Chemical Company. These aluminum oxide monohydrates are typically in the alphaform, are relatively pure, include relatively little, if any, hydrate phases other than the monohydrate, and have a high surface area.

A peptizing agent is usually added to the boehmite dispersion to produce a more stable hydrosol or colloidal dispersion. Monoprotic acids or acid compounds which may be used as the peptizing agent include hydrochloric, acetic, and nitric acid. Nitric acid is a preferred peptizing agent multiprotic acids are normally avoided since they rapidly gel the dispersion, making it difficult to handle or mix with additional components. Some commercial sources of boehmite contain acid titer, such as absorbed formic or nitric acid, to assist in forming a stable dispersion.

The dispersion may contain a nucleating agent to enhance the transformation to alpha alumina. Suitable nucleating agents include fine particles of alpha alumina, alpha ferric oxide or its percursor and any other material which will nucleate the transformation. The amount of nucleating agent is sufficient to effect nucleation. Nucleating such dispersions is disclosed in assignee's European patent application No. 0 200 487, published Nov. 5, 1986.

The dispersion is then dried by conventional means to form a porous solid. Drying may be accomplished in steps, first forming a plastic mass of the partially dried dispersion. Once sufficient water has been removed from the alumina sol or dispersion, the partially dried plastic mass may be shaped by any convenient method such as pressing, molding or extrusion and then carefully dried to produce the desired shape such as a rod, pyramid, diamond, cone and the like. Irregularly shaped abrasive grits are conveniently formed by simply depositing the sol or dispersion in any convenient size of drying vessel such as one in the shape of a cake pan and drying, usually at a temperature below the frothing temperature of the sol or dispersion.

Drying may be accomplished by simply air drying or using any of several other dewatering methods that are known in the art to remove the free water of the sol to form a solid. After the solid is dried, it can be crushed or broken by any suitable means, such as a hammer or ball mill to form grits or particles. Any method for comminuting the solid can be used and the term "crushing" is used to include all of such methods.

After crushing, the dried grits or particles are then calcined to remove essentially all volatiles. The dry grits are generally heated to a temperature between 400° C. and about 800° C. and held within this temperature range until the free water and a substantial amount of the bound water is removed, preferably over 90 weight percent of the total water. The calcined grits may then be screened and grits of a particular size or the entire batch may be used in the next steps.

The metal oxide additive or its precursor, typically a salt of the metal, is added to a liquid vehicle such as water to provide an impregnation mixture or solution, if the oxide or salt dissolves. The impregnation mixture is then imbibed or doped into the porous grits of calcined alumina. Sufficient impregnation mixture is added to the calcined alumina grits to provide at least about 0.5% by weight and preferably about 1 to about 30% by weight metal oxide additive, as calculated on a fired solids basis. It should be understood that this concentration of metal oxide additive will be the goal of the impregnation process, but the concentration will be the average concentration throughout each fired impregnated grit. Impregnation typically produces impregnated grits with higher concentrations of metal oxide additive at or near the surface than in the interior of the impregnated structure.

The concentration differential is thought to be as a result of greater concentrations of metal ions being at the surface caused by lack of penetration of the liquid vehicle into the interior of the porous grits or by outward migration of the metal ions once impregnated into the interior as drying occurs. The concentration differential caused by migration may be reduced by employing a liquid vehicle which is modified to have increased viscosity or by reaction to cause precipitation of the metal ions within the interior of the porous grit. Conventional viscosity modifiers may be used to increase the viscosity. Such increase of viscosity should not be so great, however, so as to prevent adequate penetration of the solution. Reaction of some of the impregnation solutions with $NH_4OH$ can cause the metal ions to precipitate within the porous grit. Other similar reactants will also be useful. Reactants and viscosity modifiers must be selected so as not to leave a residue on calcining or firing which will adversely affect these steps or the fired product.

The preferred metal precursor is a salt of a volatile anion. Metal salts having volatile anions include, for example, the metal nitrate, formate, acetate or the like. The most readily available chemical form of metal is typically the oxide which is easily converted to a salt with a volatile anion by reaction with an excess of concentrated nitric acid to produce nitrate solution which can conveniently be introduced into the porous alumina body in the desired amount. Metal salts and compounds which remain stable and have anions which do not volatilize at least at the firing temperature of the ceramic material should be avoided since they generally do not react with alumina to form the desired metal-aluminum oxide reaction product, as will hereinafter be explained. The metal may also be introduced as the oxide, for example, as finely divided hydrated particles as in a sol. The impregnating solution may contain other additives, e.g., a nucleating agent to enhance the transformation of the alumina hydrate to alpha alumina. The nucleating agent may also be contained in the alumina hydrate dispersion or it may be solely contained in the dispersion or the impregnating solution.

Impregnation may be accomplished in a single impregnation, i.e., using only one impregnation solution a single time or it may be accomplished in several impregnation steps. That is, more than one impregnation solution may be applied to a particular porous structure. For example, the same impregnation solution may be applied once, and, after the drying and calcining steps, applied again to increase the concentration in the porous structure of the solids being carried in the impregnation solution. The subsequent impregnation solution may also have a different concentration of solids and/or a combination of different solids. For example, the first solution may contain one metal salt and the second solution may contain a different one.

After impregnation, the impregnated grits are dried and calcined to remove bound volatile materials. Calcining is usually accomplished at a temperature of between about 400°–800° C.

The impregnated calcined grits are then sintered by heating to a temperature between about 1200° C. to about 1650° C. and holding within this temperature range until substantially all of the additive metal oxide reacts with alumina under conditions to thereby be converted to a reaction product and until substantially all of the remaining alumina is converted to a fired form, typically alpha alumina. Of course, the length of time to which the calcined material must be exposed to the sintering temperature to achieve this level of conversion will depend upon various factors but usually will be accomplished within seconds to about 30 minutes.

Other steps can be included in this process, such as rapidly heating the material from the calcining temperature to the sintering temperature, sizing granular material, centrifuging the dispersion to remove sludge waste, etc. Moreover, this process may be modified by combining two or more of the individually described steps, if desired.

The firing steps are more fully described in U.S. Pat. No. 4,314,827, the disclosure of which is herein incorporated by reference.

The ceramic materials according to the invention may have a density varying from near its theoretical density, e.g., 95% or greater, to about 75%. The ceramic material may be substantially void free or it may be characterized by including porosity, typically in the form of internal vermicular or equiaxial pores which are for the most part on the interior of the ceramic with a minor part of the pores extending to the surface. Porosity is very difficult to measure accurately by conventional porosity measuring techniques because the porosity is a mix of closed pores which do not extend to the surface and open pores which do.

The ceramic abrasive grits according to the present invention may be utilized in conventional abrasive products, preferably as a blend with less expensive conventional abrasive grits such as fused alumina, silicon carbide, garnet, fused alumina-zirconia and the like. It may also be blended with minerals or materials which are not noted as abrasives such as glass and the like.

Because of the relatively high cost of the rare earth metal compounds, it is preferred to blend ceramic abrasive grits which contain expensive starting materials with less expensive abrasive minerals. Such blending of abrasive grits is known. A preferred method of blending is described in assignee's U.S. Pat. No. 4,734,104, issued Mar. 29, 1988, involving a method known as selective mineral substitution wherein the coarse abrasive is removed from an inexpensive abrasive grit charge that is to be utilized in an abrasive product such as a coated abrasive and is substituted with coarse mineral of the invention. It is recognized in that patent application that in any coated abrasive the coarse abrasive grits are substantially responsible for a major portion of the abrading of a workpiece. By such substitution, the improved abrasive grits of the present invention are interposed in an abrasive product between smaller grits of conventional abrasive mineral to permit the improved coarse abrasive grits to do the bulk of the abrading with such product. Aforementioned U.S. Pat. No. 4,734,104 is incorporated herein by reference for its disclosure of this feature.

The ceramic abrasive grits of the present invention are conveniently handled and incorporated into various abrasive products according to well-known techniques to make, for example, coated abrasive products, bonded abrasive products, and lofty non-woven abrasive products. The methods of making such abrasive products are well-known to those skilled in the art. A coated abrasive product includes a backing, for example, formed of fabric (e.g., woven or non-woven fabric such as paper) which may be impregnated with a filled binder material, a polymer film such as that formed of oriented heat-set polypropylene or polyethylene terephthalate which may be first pied, if needed, with a priming material, or any other conventional backing material. The coated abrasive also includes a binder material, typically in layers including a make or maker coat, a size or sizing coat and possibly a supersize coat. Conventional binder materials include phenolic resins.

It has been found that the addition of a grinding aid over the surface of the abrasive grits typically in the supersize coating provides an improved grinding performance when using a coated abrasive product containing the ceramic abrasive grits of the present invention. Grinding aids may also be added to the size coat or as particulate material. The preferred grinding aid is $KBF_4$, although other grinding aids are also believed to be useful. other useful grinding aids include NACl, sulfur, $K_2TiF_6$, polyvinylidene chloride, polyvinyl chloride, cryolite and combinations and mixtures thereof. The preferred amount of grinding aid is on the order of 50 to 300 g., preferably 80 to 160 g. per square meter of coated abrasive product.

Non-woven abrasive products typically include an open porous lofty polymer filament structure having the ceramic abrasive grits distributed throughout the structure and adherently bonded therein by an adhesive material. The method of making such non-woven abrasive products is well known.

Bonded abrasive products typically consist of a shaped mass of abrasive grits held together by an organic or ceramic binder material. The shaped mass is preferably in the form of a grinding wheel. The preferred binder materials for the ceramic abrasive grits of the invention are organic binders. Ceramic or vitrified binders may be used if they are curable at temperatures and under conditions which will not adversely affect the ceramic abrasive grits of the present invention.

EXAMPLES

The following examples are illustrative of certain specific embodiments of this invention; however, these examples are for illustrative purposes only and are not to be construed as limitations upon the invention. All parts are by weight, unless otherwise specified.

Examples 1-32

Room temperature deionized water (2600 ml), 48 g of 16N analytical reagent grade nitric acid and 800 g alpha aluminum oxide monohydrate powder sold under the trade designation Disperal® were charged into an 18.9 liter polyethylene-lined steel vessel. The charge was dispersed at high speed for five minutes using a Gifford-Wood Homogenizer Mixed (Greeco Corp., Hudson, N.H.). The resulting sol was poured into a 46 cm×66 cm×5 cm polyester-lined aluminum tray where it was dried in a forced air oven at 100° C. to a friable solid.

The resultant dried material was crushed using a "Braun" type UD pulverizer having 1.1 mm gap between the steel plates. The crushed material was screened and the 0.125 mm to about 1 mm screen size material was retained and was fed into the end of a calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 15 minutes. The calciner had a hot zone feed end temperature of 350° C. and exit end temperature of 800° C.

The prefired material (100 grams) was added to 300 ml of the rare earth nitrate solution of the concentration given in Table I contained in a 500 ml glass filtering flask. An aspirator was used to pull a partial vacuum above the solution which allowed air trapped within the porosity of the grits to escape, and the rare earth nitrate solution to completely infiltrate the porosity. The partial vacuum was maintained for about one minute, after which the excess nitrate solution was removed by filtering the saturated grits over No. 4 filter paper. The grits were dried in a forced air oven at 100° C., then fed through a rotary calciner as described previously. For multiple impregnations, the prefired material is allowed to cool and is then impregnated again in the desired solution. Excess solution is removed, the material is dried and prefired again. This process may be repeated as often as necessary to obtain the desired concentration of rare earth oxide.

The fired product from the calciner was fed into a 1380° C. kiln which was a 8.9 cm diameter 1.32 meter long silicon carbide tube inclined at 4.4 degrees with respect to the horizontal and having a 76 cm hot zone, rotating at 10.5 rpm, to provide a residence time therein of about 5 minutes. The product exited the kiln into room temperature air where it was collected in a metal container and allowed to cool to room temperature.

Table I sets forth details about the preparation of Examples 1-32. These examples involve the use of only one rare earth oxide modifier. Table I reveals the relative amounts of alumina and modifier and the type of modifier. The modifier is shown as the rare earth metal oxide for convenience but it will typically be present as a complex crystal structure with the alumina, as previously explained. This crystal structure is also set forth in Table I.

The concentration of aqueous solution of rare earth metal nitrate employed in each case is also given. Where two concentrations appear for a particular example, e.g., "23/23" for Example 1, this means that the porous alumina hydrate body was impregnated twice. In Example 1, the concentration of the rare earth nitrate was the same in each impregnation. In Example 6, however, the first impregnation was with a 23% solution while the second impregnation was with a 15% solution.

TABLE I

| Ex. No. | Al$_2$O$_3$ % | Rare Earth Metal Oxide (Type) | Rare Earth Metal Oxide (%) | Crystal Structure | Rare Earth Metal Nitrate Solution Solids[1] (%) |
|---|---|---|---|---|---|
| 1 | 74 | Dy$_2$O$_3$ | 26 | Garnet | 23/23 |
| 2 | 84 | Dy$_2$O$_3$ | 16 | Garnet | 23 |
| 3 | 91 | Dy$_2$O$_3$ | 9 | Garnet | 15 |
| 4 | 95 | Dy$_2$O$_3$ | 5 | Garnet | 10 |
| 5 | 97 | Dy$_2$O$_3$ | 3 | Garnet | 5 |
| 6 | 83 | Dy$_2$O$_3$ | 17 | Garnet | 23/15 |
| 7 | 83 | Dy$_2$O$_3$ | 17 | Garnet | 23/15 |
| 8 | 94 | La$_2$O$_3$ | 6 | Beta Al$_2$O$_3$ | 22.6 |
| 9 | 94 | La$_2$O$_3$ | 6 | Beta Al$_2$O$_3$ | 22.6 |
| 10 | 85 | Gd$_2$O$_3$ | 15 | Garnet | 22.9 |
| 11 | 85 | Gd$_2$O$_3$ | 15 | Garnet | 22.9 |
| 12 | 89.4 | Pr$_2$O$_3$ | 10.6 | Perovskite | 22.5 |
| 13 | 89.6 | Pr$_2$O$_3$ | 10.4 | Perovskite | 20 |
| 14 | 90.9 | Pr$_2$O$_3$ | 9.1 | Perovskite | 17.5 |
| 15 | 91.8 | Pr$_2$O$_3$ | 8.2 | Perovskite | 15 |
| 16 | 94.6 | Pr$_2$O$_3$ | 5.4 | Perovskite | 12.5 |
| 17 | 95 | Pr$_2$O$_3$ | 5 | Perovskite | 10 |
| 18 | 87 | Yb$_2$O$_3$ | 13 | Perovskite | 22.5 |
| 19 | 88.6 | Yb$_2$O$_3$ | 11.4 | Perovskite and Garnet | 17.5 |
| 20 | 91.3 | Yb$_2$O$_3$ | 8.7 | Perovskite and Garnet | 12.5 |
| 21 | 87.7 | Er$_2$O$_3$ | 12.3 | Perovskite and Garnet | 22.5 |
| 22 | 91.4 | Er$_2$O$_3$ | 8.6 | Perovskite and Garnet | 17.5 |
| 23 | 95 | Er$_2$O$_3$ | 5 | Perovskite and Garnet | 12.5 |
| 24 | 90.5 | Sm$_2$O$_3$ | 9.5 | Perovskite | 17.4 |
| 25 | 92.4 | Sm$_2$O$_3$ | 7.6 | Perovskite | 13.1 |
| 26 | 95.7 | Sm$_2$O$_3$ | 4.3 | Perovskite | 8.7 |
| 27 | 88.2 | Sm$_2$O$_3$ | 11.8 | Perovskite | 17.4/8.7 |
| 28 | 89.8 | Sm$_2$O$_3$ | 10.2 | Perovskite | 18.4 |
| 29 | 85.9 | La$_2$O$_3$ | 10.1 | Beta Al$_2$O$_3$ | 18.1 |
| 30 | 94.3 | La$_2$O$_3$ | 5.7 | Beta Al$_2$O$_3$ | 11.3 |
| 31 | 91.9 | La$_2$O$_3$ | 8.1 | Beta Al$_2$O$_3$ | 15.1 |
| 32 | 89.4 | La$_2$O$_3$ | 10.6 | Beta Al$_2$O$_3$ | 18.8 |

[1]Reported as oxide equivalent.

Abrasive grits of each of the examples were made into coated abrasive products which were tested for abrasiveness. The coated abrasive products were made according to conventional coated abrasive making procedures. The abrasive grits were screened to yield various grain sizes or abrasive grit grades and the desired grade selected for the particular construction. The abrasive grits were bonded to polyester or vulcanized fiber backings using conventional make, size, and optionally supersize adhesive resin compositions.

Table II reveals the grit size (grade), the composition of the abrasive grits, and grinding aid, if used, the total amount of metal removed in a grinding test (Total Cut) and the relative grinding performance according to a "disc test" (unless otherwise specified) as described below when compared to the performance of a standard consisting of commercial grade fused alumina-zirconia abrasive grits available under the trade designation NorZon®. In Table II, the given grade size refers to abrasive grit having an average diameter as follows:

| Grade | Average Diameter (micrometers) |
|---|---|
| 36 | 710 |
| 40 | 600 |
| 50 | 430 |

The term "disc" test refers to disc test hereinafter described.

The disc test involved the testing of 17.8 cm diameter abrasive discs having the following approximate coating weights:

| Grade | Make Resin | Mineral | Size Resin | Supersize |
|---|---|---|---|---|
| 36 | 4.2 g | 18.8 g | 13.6 g | 8 g |
| 40 | 4.2 g | 18.0 g | 13.0 g | 8 g |
| 50 | 4.2 g | 13.2 g | 8.7 g | 6 g |

Disc Test

The discs were prepared using conventional coated abrasive making procedures, conventional 0.76 mm vulcanized fiber backings and conventional calcium carbonate-filled phenolic resin make and size resins, without adjusting for mineral density differences. The make resin was precured for 90 minutes at 88° C. and the size resin precured for 90 minutes at 88° C. followed by a final cure of 100° C. for 10 hours. The coating was done using conventional techniques in a one-trip operation with curing in a forced air oven. The cured discs were first conventionally flexed to controllably break the hard bonding resins, mounted on a beveled aluminum back-up pad, and used to grind the face of a 2.5 cm by 18 cm 304 stainless steel workpiece. The disc was driven at 5,500 rpm while the portion of the disc overlaying the beveled edge of the back-up pad contacted the workpiece at 5.91 kg pressure generating a disc wear path of about 140 $cm^2$. Each disc was used to grind a separate workpiece for one minute each for a total time of 12 minutes each or for sufficient one minute time segments until no more than 5 grams of metal were removed in any one minute grinding cut. The total cut for each disc is reported in Table II. The relative cumulative cut of each of the 12 cuts (or for a lesser number of cuts, depending upon performance) for each disc, using the cumulative cut of a disc made of a control abrasive grain as 100%, was calculated and is also tabulated in Table II. All of the grinding data was generated using the Disc Test unless otherwise indicated in which case the grinding data was generated using an Abrasive Belt Test as described below.

Abrasive Belt Test

Grade 50 coated abrasive sheets were converted to 7.6 cm×335 cm endless abrasive belts and tested on a constant load surface grinder, abrading the 2½cm×18.4 cm face of a 304 stainless steel workpiece with 30 successive 60 second grinding passes, weighing and cooling after each pass, employing 25 lb pressure, a 2000 m/min belt speed, and 1.8 m/min workpiece feed rate.

TABLE II

| Ex. No. | Additive (Type) | Additive (%) | Abrasive Grade | Grinding Aid | Total Cut (Grams) | Relative Cut (%) |
|---|---|---|---|---|---|---|
| 1 | $Dy_2O_3$ | 26 | 40 | — | 46 | 107 |
| 2 | $Dy_2O_3$ | 16 | 40 | — | 36 | 84 |
| 3 | $Dy_2O_3$ | 9 | 40 | — | 22 | 52 |
| 4 | $Dy_2O_3$ | 5 | 40 | — | 18 | 41 |
| 5 | $Dy_2O_3$ | 3 | 40 | — | 20 | 45 |
| 6 | $Dy_2O_3$ | 17 | 40 | — | 105 | 64 |
| 7 | $Dy_2O_3$ | 17 | 40 | $KBF_4$ | 354 | 215 |
| 8 | $La_2O_3$ | 6 | 36 | — | 57 | 88 |
| 9 | $La_2O_3$ | 6 | 36 | $KBF_4$ | 127 | 102 |
| 10 | $Gd_2O_3$ | 15 | 36 | — | 137 | 110 |
| 11 | $Gd_2O_3$ | 15 | 36 | $KBF_4$ | 231 | 186 |
| 12 | $Pr_2O_3$ | 10.6 | 50 | $KBF_4$ | 54 | 88 |
| 13 | $Pr_2O_3$ | 10.4 | 50 | $KBF_4$ | 46 | 76 |
| 14 | $Pr_2O_3$ | 9.1 | 50 | $KBF_4$ | 47 | 76 |
| 15 | $Pr_2O_3$ | 8.2 | 50 | $KBF_4$ | 45 | 74 |
| 16 | $Pr_2O_3$ | 5.4 | 50 | $KBF_4$ | 118 | 194 |
| 17 | $Pr_2O_3$ | 5 | 50 | $KBF_4$ | 147 | 241 |
| 18 | $Yb_2O_3$ | 13 | 50 | $KBF_4$ | 125 | 204 |
| 19 | $Yb_2O_3$ | 11.4 | 50 | $KBF_4$ | 100 | 164 |
| 20 | $Yb_2O_3$ | 8.7 | 50 | $KBF_4$ | 85 | 140 |
| 21 | $Er_2O_3$ | 12.3 | 50 | $KBF_4$ | 197 | 322 |
| 22 | $Er_2O_3$ | 8.6 | 50 | $KBF_4$ | 152 | 249 |
| 23 | $Er_2O_3$ | 5 | 50 | $KBF_4$ | 114 | 196 |
| 24 | $Sm_2O_3$ | 9.5 | 50 | $KBF_4$ | 196 | 182 |
| 25 | $Sm_2O_3$ | 7.6 | 50 | $KBF_4$ | 232 | 214 |
| 26 | $Sm_2O_3$ | 4.3 | 50 | $KBF_4$ | 177 | 164 |
| 27 | $Sm_2O_3$ | 11.8 | 50 | $KBF_4$ | 71 | 71 |
| 28 | $Sm_2O_3$ | 10.2 | 50 | — | 64 | — |
| 29 | $La_2O_3$ | 10.1 | 50 | — | 85 | — |
| 30 | $La_2O_3$ | 5.7 | 50 | — | 510* | 84 |
| 31 | $La_2O_3$ | 8.1 | 50 | — | 429* | 70* |
| 32 | $La_2O_3$ | 10.6 | 50 | — | 105* | 17* |

*Belt Test

While this invention has been described in terms of specific embodiments, it should be understood that it is capable of further modifications. The claims herein are intended to cover those variations which one skilled in the art would recognize as the chemical equivalent of what has been described here.

What is claimed is:

1. A method of making ceramic abrasive grits, said method comprising the steps of:

a. providing a sol of alumina hydrate;

b. drying the sol to form a dried porous solid comprised of the dried sol;

c. crushing the dried porous solid to produce porous particles;

d. preparing a homogeneous mixture of metal oxide or metal oxide precursor in a liquid vehicle and a material which will cause the metal of the metal oxide precursor to form a precipitate within said porous particles, said metal oxide being capable of being converted upon calcining and firing to a modifying additive;

e. calcining the dried particles of step c to substantially remove water of hydration and convert the alumina hydrate to an alumina form which is insoluble in the liquid vehicle;

f. impregnating the mixture of step d into the calcined particles of step e to achieve an average concentration of modifying additive in the resultant ceramic after firing of at least about 0.5% by weight on a fired solids basis;

g. drying the impregnated particles;

h. calcining the dried impregnated particles to substantially remove bound volatile materials; and i. firing the calcined particles to produce ceramic abrasive grits.

2. The method of claim 1 wherein said material produces $NH_4OH$.

3. The method of claim 1 wherein said sol includes sufficient nucleation agent to effect nucleation.

4. The method of claim 1 wherein the average concentration of said modifying additive in the resultant ceramic after firing is about 0.5% by weight on a fired solids basis.

5. A method of making ceramic abrasive grits, said method comprising the steps of:
   a. providing a sol of alumina hydrate;
   b. drying the sol to form a dried porous solid comprised of the dried sol;
   c. crushing the dried porous solid to produce particles having pores;
   d. preparing a homogeneous mixture of metal oxide or metal oxide precursor in a liquid vehicle and a material to increase viscosity of the mixture sufficient to reduce migration of said mixture upon drying when impregnated into the pores of said particles yet permit impregnation, said metal oxide being capable of being converted upon calcining and firing to a modifying additive;
   e. calcining the dried particles of step c to substantially remove water of hydration and convert the alumina hydrate to an alumina form which is insoluble in the liquid vehicle;
   f. impregnating the mixture of step d into the calcined particles of step e to achieve an average concentration of modifying additive in the resultant ceramic after firing of at least about 0.5% by weight on a fired solids basis;
   g. drying the impregnated particles;
   h. calcining the dried impregnated particles to substantially remove bound volatile materials; and
   i. firing the calcined particles to produce ceramic abrasive grits.

6. The method of claim 5 wherein said sol includes sufficient nucleation agent to effect nucleation.

7. The method of claim 5 wherein the average concentration of said modifying additive in the resultant ceramic after firing is about 0.5% by weight on a fired solids basis.

* * * * *